United States Patent [19]
Duteurtre et al.

[11] Patent Number: 4,655,265
[45] Date of Patent: Apr. 7, 1987

[54] METHOD AND APPARATUS FOR DISPENSING PARTICLES INTO A CONTAINER

[75] Inventors: Bruno H. J. Duteurtre; Philippe A. Coulon, both of Epernay; René M. Goutard, Verrieres le Buisson, all of France

[73] Assignee: Champagne Moet & Chandon, France

[21] Appl. No.: 775,733

[22] Filed: Sep. 13, 1985

[30] Foreign Application Priority Data

Oct. 2, 1984 [FR] France .............................. 84 15129

[51] Int. Cl.⁴ .............................................. B65B 3/04
[52] U.S. Cl. ......................................... 141/9; 141/16; 141/67; 141/129; 141/44
[58] Field of Search ................. 141/129–191, 141/1–12, 14–18, 37–70; 222/630

[56] References Cited

U.S. PATENT DOCUMENTS

B 394,742  4/1976  Spooner .................... 426/8
2,356,176  8/1944  Pechy ...................... 226/102

FOREIGN PATENT DOCUMENTS

3202655  4/1983  Fed. Rep. of Germany .
2432045  2/1980  France .

*Primary Examiner*—Houston S. Bell, Jr.
*Attorney, Agent, or Firm*—Steinberg & Raskin

[57] ABSTRACT

The invention relates to a process and an apparatus for the transfer and dispensing of brittle solid particles, the apparatus comprises a transfer and dispensing device including a chamber divided into first and second sections by a transverse partition wall provided with one or several holes, of a diameter smaller than that of the solid particles, the two sections communicating with one another through said holes. The first section is a dispensing section proper, ending at its lower end with an opening defined by the open lower end of said chamber, wherreas the second suction or discharge section, cooperates with a suction and discharge device. The apparatus ensures an accurate proportioning and a high rate of introduction of the solid particles into bottles, reaching 25000 bottles per hour, without damaging them.

10 Claims, 8 Drawing Figures

METHOD AND APPARATUS FOR DISPENSING PARTICLES INTO A CONTAINER

BACKGROUND OF THE INVENTION

The present invention relates to a process and an apparatus for transferring and/or dispensing, especially at a high rate, brittle solid particles with a view to their use for any desired purpose, e.g. their introduction into a container, particularly a bottle, the said brittle solid particles consisting preferably of alginate beads or like small balls containing inclusions of microorganisms, particularly yeasts, with a view, especially, to fermenting a liquid capable of fermentation, such as grape juice, wine, preferably Champagne wine.

When making sparkling Champagne wine, the yeasts were hitherto mixed with the wine to which sugar had been added in large tanks and the homogeneous mixture obtained was introduced or injected into the bottles by gravity and/or under the action of vacuum and/or of overpressure by means of volumetric or continuous dispensing devices using mechanical members such as slide-valves, clack-valves, endless screws or gate-valves.

This prior technique was improved by using the yeasts in the form of inclusions in a vehicle material, such as an alginate, in the form of spherical beads (see French Pat. No. 78 22131 INRA).

Such use of the yeasts or other fermentation microorganisms in the form of inclusions in a vehicle material consisting of solid gelled beads greatly facilitates the separation of the yeasts or other micro-organisms after the fermentation.

However, Applicant became aware of the new technical problem raised by such use of the yeasts in the form of inclusions, i.e. of the need for preventing the deterioration of the vehicle material when tranferring the beads containing the yeast or other micro-organism inclusions into bottles or other fermentation containers, so as to avoid freeing the yeasts or other micro-organisms in the medium, e.g. the wine or grape juice, to be fermented, since such freeing of the yeasts or other micro-organisms would annihilate the advantage offered by their use in the form of inclusions, i.e. easy separation of the yeasts or other fermentation microorganisms from the fermented medium, and in order also to avoid abnormal turbidity which would be an obstacle to the sale of the product or would hinder its preservation especially in the case of wine or Champagne wine.

SUMMARY OF THE INVENTION

The present invention therefore has as a purpose to resolve the said new technical problem.

Furthermore, the present invention also has for a purpose to provide means for resolving the said novel technical problem in an extremely simple manner, without deteriorating the vehicle material in any circumstances during its transfer in the form of beads containing the yeasts or other fermentation micro-organism inclusions.

Furthermore, another technical problem is posed by the requirement of accurate proportioning of the amount of micro-organisms, e.g. the yeasts, to be introduced in the included state into the container, particularly a bottle, in which the fermentation is to take place.

Therefore, the invention has as still another purpose to provide means for highly accurate proportioning of the amount of yeasts or micro-organisms transferred into the container, particularly a bottle.

Lastly, still another purpose of the present invention is to provide means for resolving the aforementioned problems in such a manner as to be applicable to the transfer and/or dispensing of any brittle solid particles generally, without damaging the same and at a high rate.

According to a first aspect of the present invention, there is provided a process for transferring and/or dispensing, especially at a high rate, brittle solid particles without damaging them and with a view to their use for any desired purpose, e.g. their introduction into a container, particularly a bottle, characterized in that it includes the steps of:

providing a transfer and/or dispensing device including an elongate chamber having a preferably substantially cylindrical lateral wall defining the said chamber, the said chamber having an open lower end and an upper closed end and containing a transverse partition wall provided with at least one hole, preferably a plurality of holes, of a smaller diameter than that of the solid particles, and arranged in substantially perpendicular relationship to the said lateral wall and in spaced relationship to the ends of the said chamber so as to subdivide said chamber into two sections communicating with one another through the said holes, namely, a first, transfer and/or dispensing section proper ending at its lower end with an opening defined by the open lower end of the said chamber, and a second, suction or discharge section co-operating with suction or discharge means;

suspending the solid particles in a suitable liquid;

introducing at least the lower portion of the said first section into the suspension thus obtained;

suction of the said suspension by the said suction means so as to cause the said liquid to be sucked into the said second section while the solid particles are accumulated in the said first, transfer and/or dispensing section until they are flush with the aforesaid opening of the said first section;

displacing the transfer and/or dispensing device out of the suspension and then to the place of introduction of the said solid particles; and discharging the said solid particles by means of the said discharge means, thus discharging the said liquid from the second section, and the said brittle solid particles, thus entrained into the said liquid, into the said container.

According to a preferred form of embodiment of the invention, the steps of introduction, suction, displacement and discharge are carried out automatically by appropriate control means, preferably mechanical control means.

According to a specific form of embodiment, the said control means include cam elements co-operating with cam follower elements.

According to a particularly preferred application of the invention, the particles consist of calcium-alginate spherical beads containing fermentation microorganism inclusions, particularly in suspension in a liquid capable of fermenting, consisting in particular of wine, preferably Champagne wine, or of grape juice. In this specific case, the particles are preferably introduced into bottles.

Furthermore, according to a particularly preferred form of embodiment, the solid particles are replaced by beads of a polymer of a density higher or slightly higher than that of the liquid capable of being fermented by the microorganisms included.

According to another aspect of the present invention, there is also provided an apparatus for transferring and/or dispensing, especially at a high rate, brittle solid particles without damaging them and with a view to their use for any desired purpose, e.g. their introduction into a container, particularly a bottle, characterized in that it includes a transfer and/or dispensing device including an elongate chamber having a preferably substantially cylindrical lateral wall defining the said chamber, the said chamber having an open lower end and a closed upper end, containing a tranverse partition wall provided with at least one hole, preferably a plurality of holes, of a smaller diameter than the diameter of the said solid particles, and arranged in substantially perpendicular relationship to the said lateral wall and in spaced relationship to the ends of the said chamber so as to sub-divide the same into two sections communicating with one another through the said holes, namely, a first, transfer and/or dispensing section proper ending at its lower end with an opening defined by the open lower end of the said chamber, and a second, suction or discharge section co-operating with the said suction or discharge means; and means for actuating the said suction or discharge means.

According to one form of embodiment of the apparatus of the invention, the suction or discharge means include a piston arranged in the second, suction or discharge section and slidably with respect to the said second section, thus forming therewith pump means, the said piston being actuated by the said actuating means. According to a specific form of embodiment, the said actuating means include mechanical control means. Preferably, the said mechanical control means include cam elements and cam follower elements.

According to the presently preferred form of embodiment, the transfer and/or dispensing device is so mounted as to be movable in vertical translation and in rotation with respect to a frame, between a position for suspended solid-particle draw-off of suction into a suitable tank, and a position for discharge of the solid particles into any container, particularly a bottle.

According to a particularly preferred form of embodiment, the apparatus of the invention includes a drum mounted rotatably with respect to the frame and provided with a plurality of transfer and/or dispensing devices uniformly spaced from one another; means for displacing solid-particle receiving containers, particularly bottles, to a location opposite each transfer and/or dispensing device. The said container displacing means may include a container distributing drum arranged radially outwardly of the drum provided with the transfer and/or dispensing device; and means for synchronized rotation of the drum provided with the transfer and/or dispensing device and of the displacing means (62, 64).

Thus, the process and apparatus of the invention ensure the transfer of the brittle solid particles in an altogether reliable manner and without damaging them. Furthermore, since the solid-particle suspension liquid is separated from the said solid particles in the said second section, the said solid particles accumulate in the first section in a predetermined amount clearly defined by the volume of the said first section.

Thus, by previously determining the volume of the first section, an accurate proportioning of the solid particles is ensured inherently.

The technical advantages of the present invention are altogether new and manifestly unexpected to anybody conversant with the art.

BRIEF DESCRIPTION OF THE DRAWINGS

Other purposes, features and advantages of the present invention will appear as the following explanatory description proceeds with reference to the appended drawings illustrating a presently preferred form of embodiment of the apparatus of the present invention given solely by way of example and which therefore should in no way be construed as limiting the scope of the invention. In the appended drawings.

DESCRIPTION OF THE PREFERRED EMBODIMENTS

Figure 1:
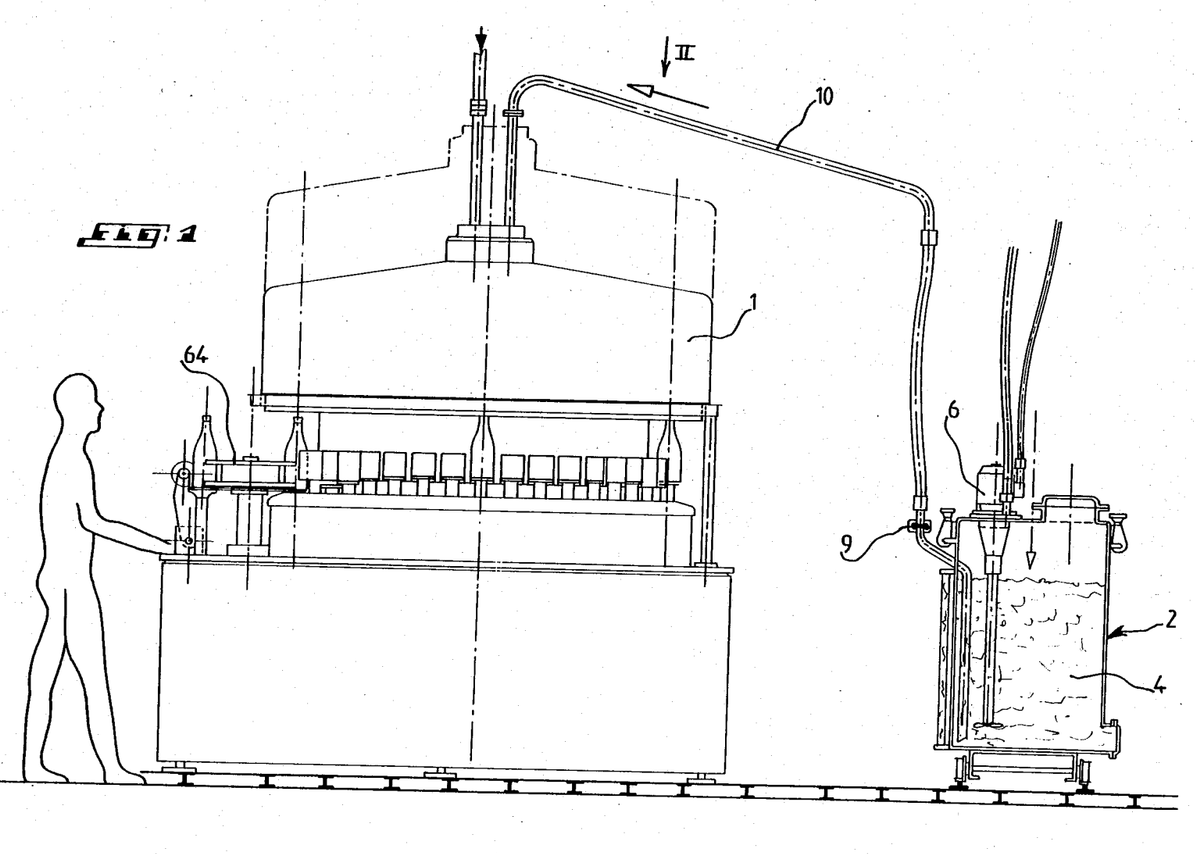
FIG. 1 is a side elevational view, partially in section and partially broken away, of the presently preferred form of embodiment of an apparatus for the transfer and/or dispensing, particularly at a high rate, of brittle solid particles in accordance with the present invention.
Figure 2:
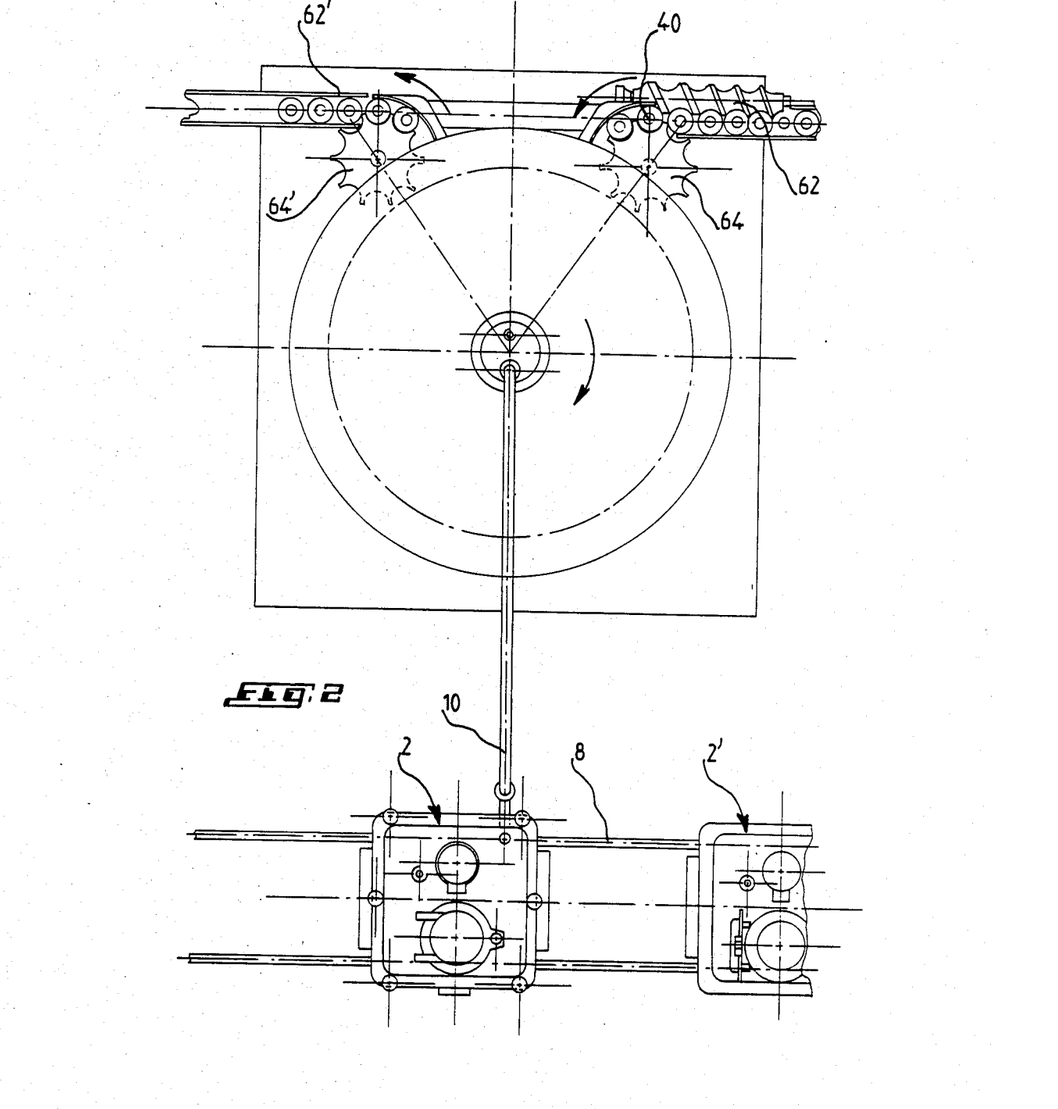
FIG. 2 is a top view in the direction of arrow II of FIG. 1.

Referring to FIG. 1, a transfer and/or dispensing device of the present invention is designated by the general reference numeral 1. Designated generally by the reference numeral 2 is a carriage carrying a reserve of brittle solid particles 4. According to the illustrated, presently preferred example of application of the present invention, the said brittle solid particles may consist of calciumalginate spherical beads or like small balls containing inclusions of microorganisms, e.g. yeasts, usable for the fermentation of a liquid. Preferably, the said liquid is wine, particularly Champagne wine. The solid particles 4 are suspended in a liquid 5 such as preferably wine. The said suspension is homogenized by stirring by means of an agitator 6. The carriage 2 is movable along rails 8, as seen in FIG. 2, so that it can be replaced by another carriage or truck 2'. To this end, the carriage 2 is connected in an easily disconnectable manner, by any known quick-connecting means 9 to a conduit 10 which is clearly seen in FIG. 4 and which supplies the suspended solid particles 4 to an annular vat or the like 12 provided within the apparatus 1 and which is either stationary by being secured to the frame 14 of the apparatus or jointly rotatable with the drum 60 to be described later.

Figure 3:
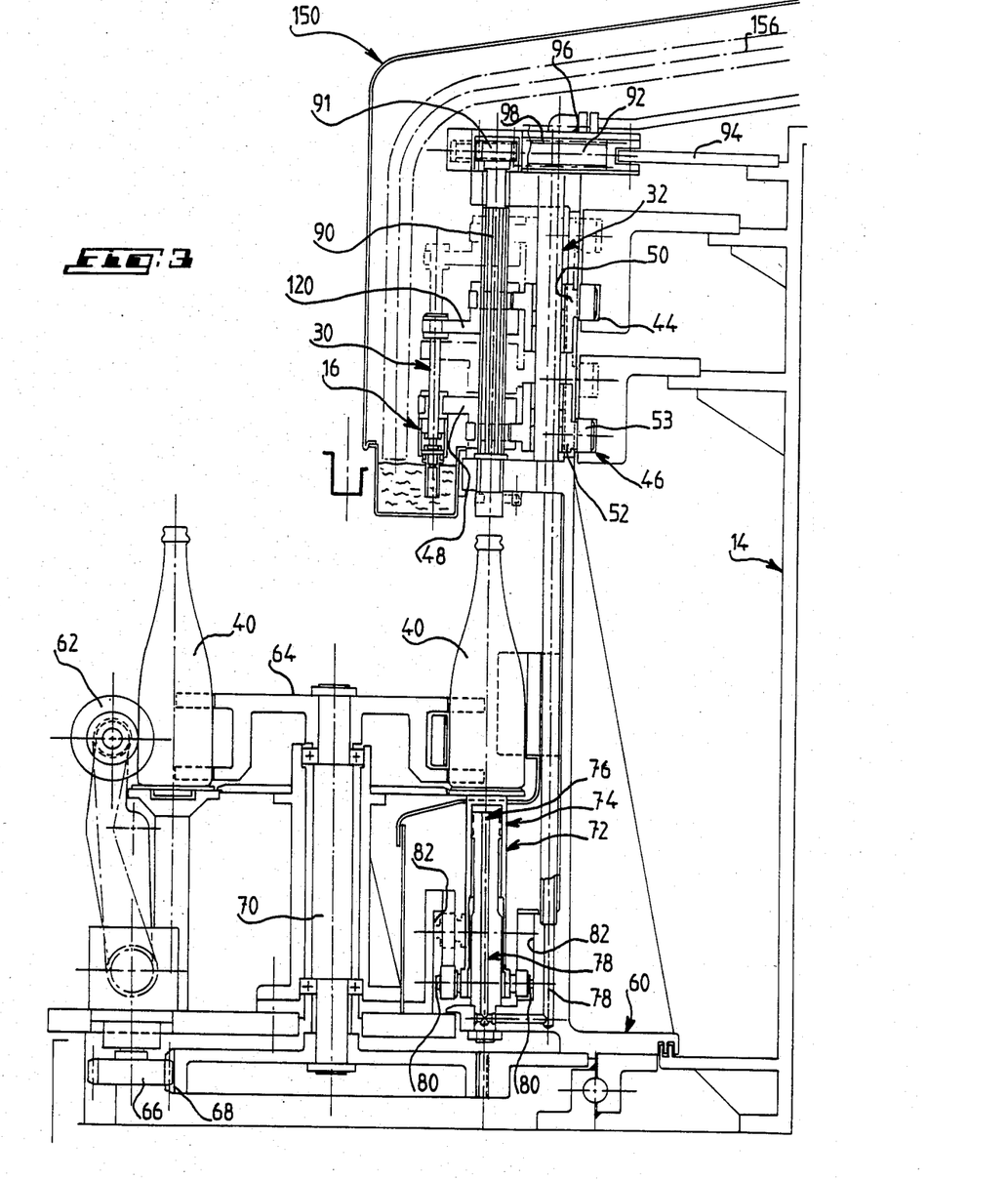
FIG. 3 is a vertical or longitudinal axial half-sectional view of the left-hand portion of the apparatus shown in FIG. 1.
Figure 4:
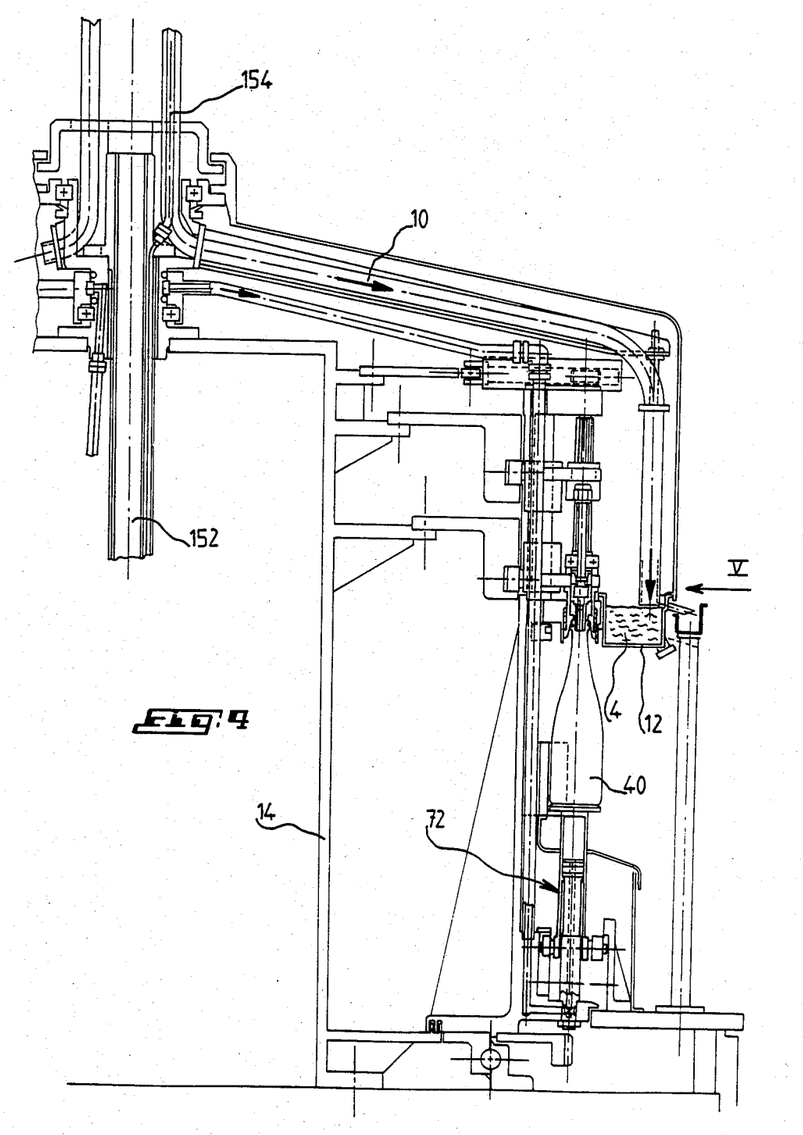
FIG. 4 is a vertical or longitudinal axial half-sectional view of the right-hand portion of the apparatus shown in FIG. 1.
Figure 8:
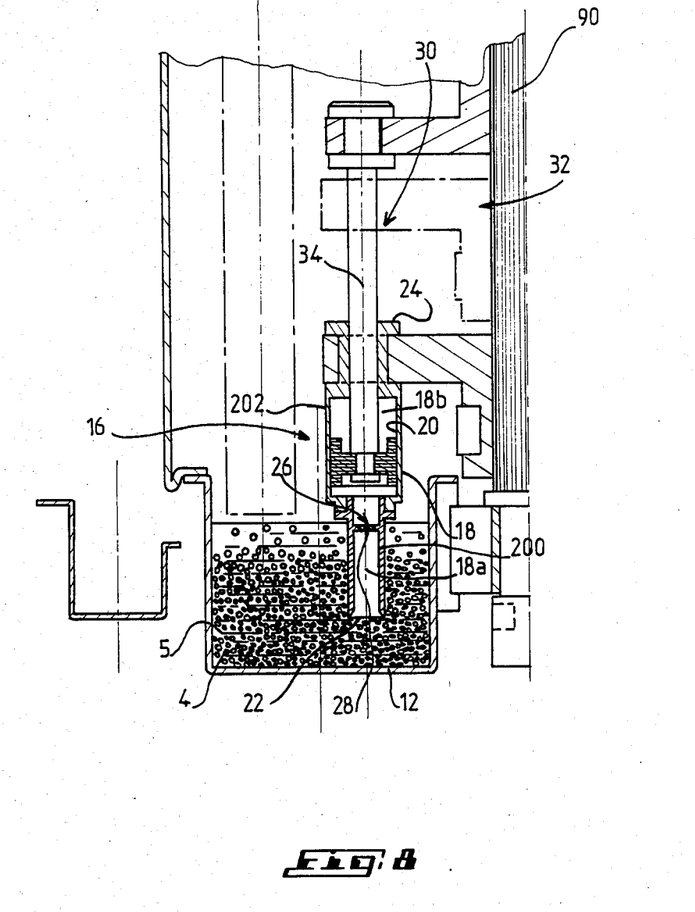
FIG. 8 is an enlarged view of the transfer and/or dispensing device.

As can be clearly seen in FIGS. 3, 4 and 8, the apparatus 1 of the invention is characterized in that it includes a transfer and/or dispensing device 16 including an elongate chamber 18 having a lateral wall 20 defining the said chamber and preferably essentially cylindrical as illustrated, the said chamber having an open lower end 22 and a closed upper end 24 and containing a transverse partition wall 26 provided with at least one hole 28, or preferably a plurality of such holes as illustrated, of a smaller diameter smaller than that of the said solid particles 4, and arranged in subtantially perpendicular relationship to the said lateral wall 20 and in spaced relationship to the said ends 22, 24 of the said chamber. It is thus readily understood that the transverse partition wall 26 sub-divides the chamber 18 into two communicating sections, namely, a first, transfer and/or dispensing section proper 18a ending at its lower end with an opening defined by the open lower end 22 of the chamber 18, and a second, suction or discharge section 18b co-operating with suction or discharge means 30; and means 32 for actuating the said suction or discharge means 30 (FIGS. 3 and 8).

According to a presently preferred form of embodiment, the suction and discharge means 30 include a piston 34 arranged in the second, suction or discharge section 18b in sliding relationship to the said section, thus forming therewith pump means, the said piston 34 being actuated by the aforesaid actuating means 32.

According to the illustrated, presently preferred form of embodiment, the transfer and/or dispensing device 16 is so mounted as to be movable in vertical translation and in rotation with respect to the frame 14, between a position for drawing-off or suction of the suspended solid particles from the tank 12 (which position is shown in FIG. 3), and a position for discharge (shown in FIG. 4) of the solid particles 4 into any container, particularly a bottle 40, as clearly seen in FIGS. 3 and 4.

Furthermore, also according to a presently preferred form of embodiment, the actuating means 30 include mechanical operating means. The said mechanical operating means preferably include cam elements 44 and 46 co-operating with cam follower elements 50 and 52.

According to a further presently preferred form of embodiment, the apparatus 1 of the invention includes a drum or the like 60 mounted rotatably with respect to the frame 14 and provided with a plurality of transfer and/or dispensing devices 16 regularly spaced from one another. Conveying means 62, 64 for the containers, particularly the bottles, 40 intended to receive the solid particles are also provided to convey the said containers to a location opposite each transfer and/or dispensing device 16, as is clearly understood particularly from FIGS. 2, 3 and 4. For example, 40 devices 16 are provided to reach a high rate of, for example, 25000 bottles per hour.

The said conveying means may include more specifically a drum 64 for distributing the containers 40, arranged radially outwardly with respect to the drum 60 provided with the transfer and/or dispensing devices 16.

There are also provided, of course, means for synchronized rotation of the drum 60 provided with the transfer and/or dispensing devices and the distributing drum 64. Such synchronizing means are well known in the art and include systems of toothed wheels such as the wheels 66, 68 seen in FIG. 3.

It could be observed that the containers 40 may be supplied, for example, behind one another by means 62 constituted, in the example illustrated, by an endless screw in quite a conventional manner.

Thus, the drum 64 driven in rotation by a shaft 70 connected to the toothed wheel 68 causes the containers 40 to move from the means 62, constituted in the case considered by an endless screw, onto container receiving means 72 which are clearly seen in FIGS. 3 and 4.

Such receiving means, just like the distributing means, are quite conventional in the field of filling of containers, particularly of bottles.

The said receiving means 72 include a hollow support element 74 in which a piston is mounted so as to form pneumatic jack means supplied with a hydraulic fluid, particularly air, from below, i.e. through the passageway 78, so that in case a pressure is exerted on the bottle neck, the support element 74 is displaced, in particular downwardly, thus preventing the container from being damaged, particularly if the container is a bottle 40 of glass or any other frangible material.

Figure 5:
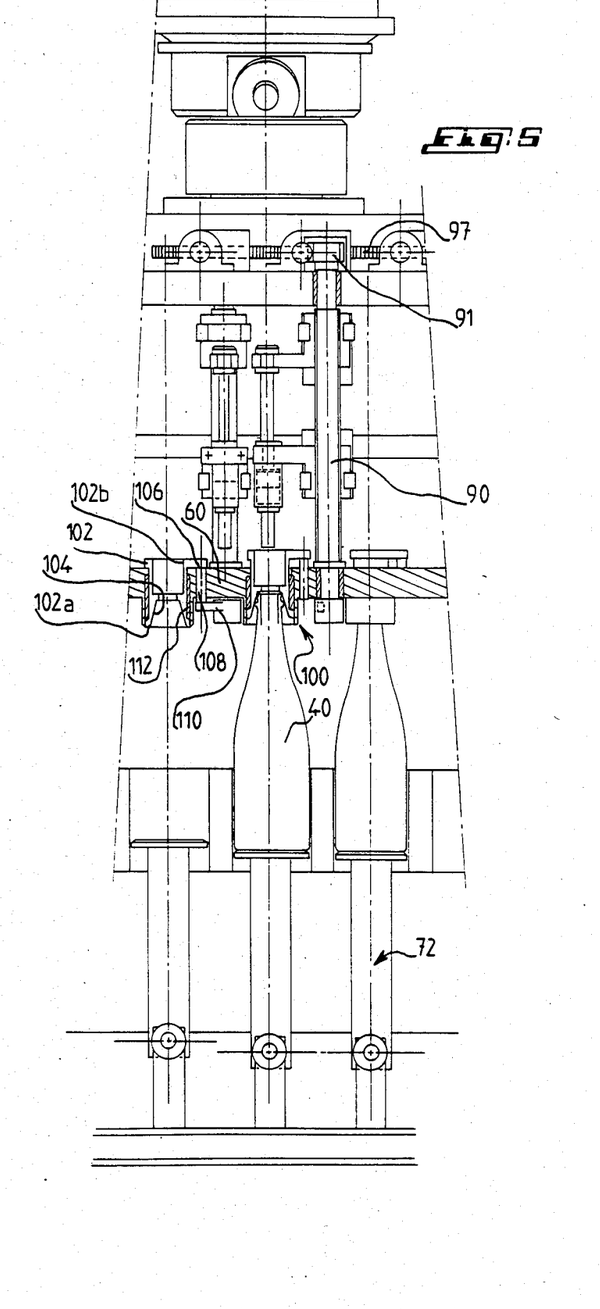
FIG. 5 is a view in the direction of arrow V of FIG. 4.

This automatic change in the position of the containers 40 is clearly seen in FIG. 5.

Lastly, it will be observed that the receiving means 72 are guided during their displacement by a system of rollers 80 rolling in suitable cam paths 82 formed in a corresponding portion of the drum 60.

Figure 7:
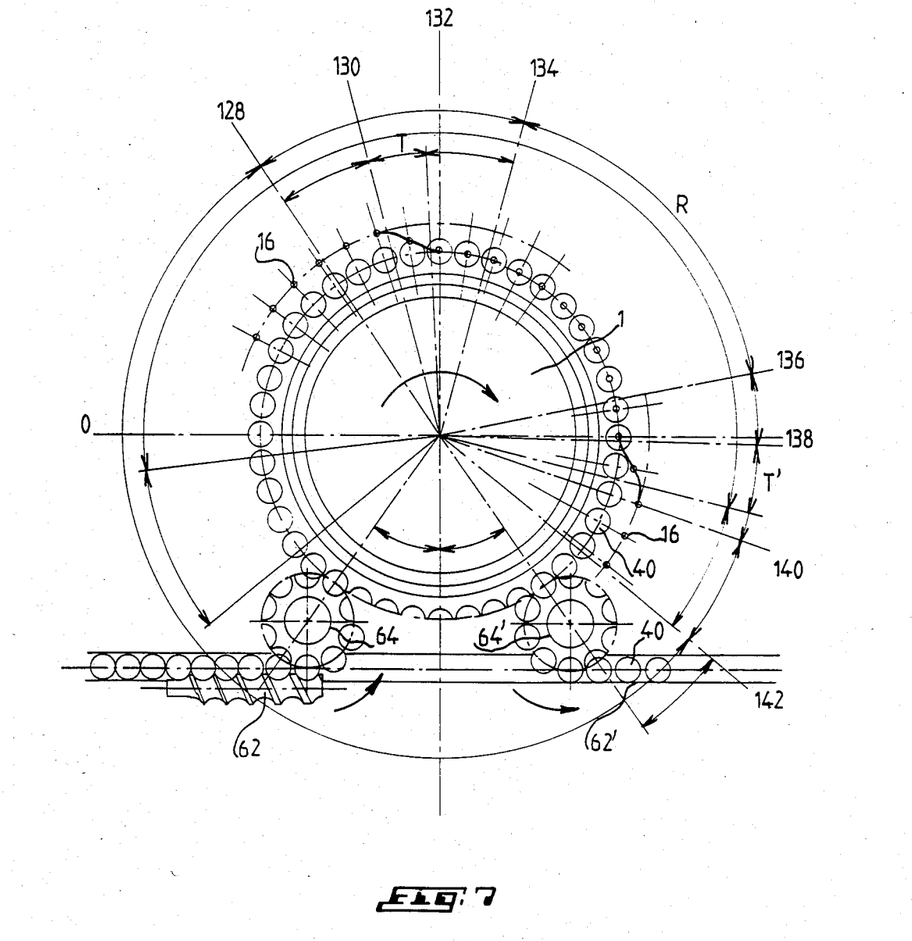
FIG. 7 diagrammatically illustrates the curve of displacement of the bottles, i.e. of the container type preferably used in the present invention, into which the brittle solid particles are to be introduced, as well as the travel path of the transfer and/or dispensing device.

Of course, there are provided at the exit of the apparatus 1 of the invention identical conveying means designated by the reference numerals 62', 64' and clearly seen in FIG. 7. The rotation of the means 62', 64' is identical with that of the means 62, 64, but the conveying means 62', 64' are so arranged, as clearly seen in FIGS. 2 and 7, as to transfer the containers 40 beyond the transfer and/or dispensing apparatus 1, either to a storage station for the containers 40 or to another apparatus for introducing other elements into the containers. In case the bottles 40 are intended to be filled with wine, the filling of the bottles or like containers 40 with wine may be performed at a later stage, as is preferred in the present invention, although the reverse order of operations may be adopted.

Furthermore, as already mentioned in the foregoing, the transfer and/or dispensing device 16 is so mounted as to be movable in vertical translation and in rotation with respect to the frame 14 between a draw-off position shown in FIG. 3 and a discharge position shown in FIG. 4.

Preferably, according to the form of embodiment illustrated, the transfer and/or dispensing device 16 is jointly rotatable with a splined shaft 90 arranged substantially vertically and freely movable in rotation with respect to the drum 60. This splined shaft 90 itself is moved in rotation by cam follower means 92 co-operating with cam means 94 provided on the frame 14 of the apparatus 1. In the case considered here, the cam follower means 92 are designed in the form of a piston movable in a jack body 96 and permanently applied by resilient means such as a spring 98 to the cam means 94. It should be noted that, according to the invention, the containers 40 are preferably arranged on receiving means 72 substantially along the circumferencial displacement path of the axis of rotation of the transfer and/or dispensing device 16, i.e., the axis of rotation of this splined shaft 90, in a shifted manner with respect to the latter so that, as a result of the rotation of this splined shaft 90, the transfer and/or dispensing device 16 is moved either to a position above the tank 12 for the solid particles to be transferred or above the containers 40 into which the solid particles are to be transferred (FIGS. 3 and 4). The jack body 96 is externally in the shape of a toothed rack 97 meshing with a toothed wheel 91 secured to the splined shaft 90 (FIGS. 3 and 5).

It is clear that, as a result, the cam means 94 have a cam profile causing this displacement in an appropriate manner. This cam profile is shown by the curve C in FIG. 6. It will be observed that, in the form of embodiment illustrated, the radial dimension of the cam means 94 is merely varied to obtain the rotation of the splined shaft 90 and therefore of the transfer and/or dispensing device 16. It is understood that, in the example illustrated, when the radial dimension of the cam means 94 is the largest, the position of the transfer and/or dispensing device 16 with respect to the splined shaft 90 is the one shown in FIG. 3, i.e. the position allowing the drawing off of the solid particles, whereas, when the said radial dimension of the cam means 94 diminishes progressively, as in the portion T of the curve C (FIG. 6), the splined shaft 90 is caused to rotate and the transfer and/or dispensing means 16 is transferred above the containers 40, which position is shown in FIG. 4 and corresponds to the curve portion R of the curve C, which is the particle discharge positon. This angle of rotation is of course predetermined by the profile of the cam 94 and is preferably about 90°.

According to the present invention, the apparatus 1 preferably includes a safety device 100 which is clearly seen in FIG. 5, preventing the discharge of the solid particles sucked into the first section of the transfer and/or dispensing device 16 in the absence of any container 40 on the receiving means 72.

According to the form of embodiment illustrated in FIG. 5, the safety device 100 includes ring means 102, preferably substantially cylindrical in shape and including a lower portion adapted to the upper end of the containers 40. Thus, in case the containers 40 consist of bottles, the lower portion 102a of the ring 102 includes an internal cavity 104 with a frusto-conical profile the smaller base of which is directed towards the interior of the ring 102. The ring 102 is so mounted as to be vertically movable with respect to the drum 60, so that when a container 40 is received on the receiving means 72, the container pushes the ring upwardly thus ensuring an accurate positioning of the container 40 owing to the profile 104. Moreover, in the case considered, the ring 102 is provided at its upper portion 102b with a substantially horizontal extension 106 provided with a vertical pin 108 which, in the lower position of the ring 102 and in the absence of a container 40, fulfils the function of a stop element with respect to a horizontal pin 110 provided on the lower portion of the splined shaft 90. It is readily understood that, in the presence of a bottle as seen in the central position in FIG. 5, the ring 102 which has been pushed upwardly by the upper end of the container 40, causes the vertical pin 108 serving as a retractable stop means, to be retracted upwardly, thus allowing the horizontal pin 110 of the splined shaft 90 to pass freely and the said shaft to rotate freely when the cam follower means 92 have to follow a variation of the profile of the cam means 94. Of course, the ring 102 is permanently pushed downwardly by a usual resilient means 102, such as a spring.

Furthermore, the transfer and/or dispensing device 16 is so mounted as to be freely movable in vertical translation with respect to the shaft 90.

This movement in vertical translation takes place as follows (FIGS. 3, 5 and 8).

Figure 6:
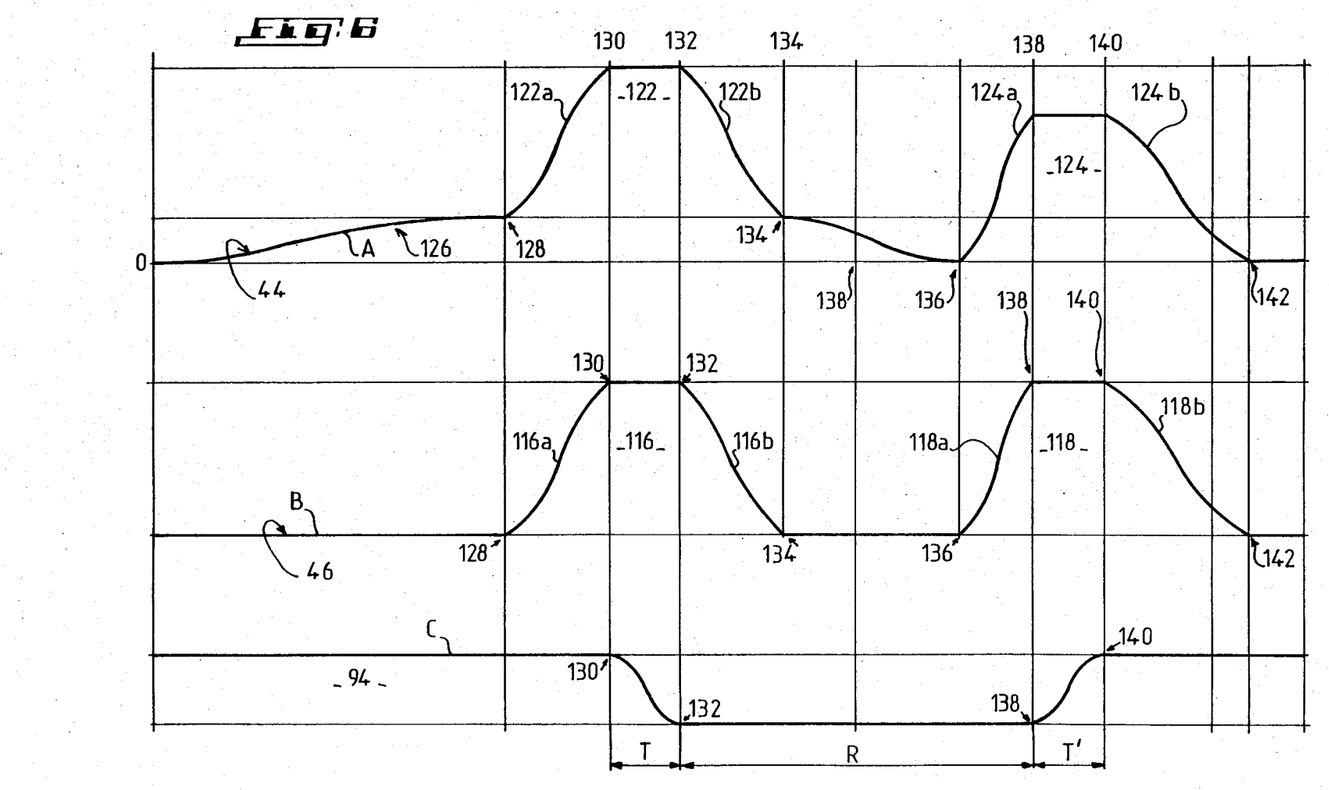
FIG. 6 is a view showing the profile of the cam means, wherein curve A shows the profile of the cam means of the piston of the transfer and/or dispensing device of the present invention, curve B shows a profile of the cam means of the transfer and/or dispensing device of the present invention, and curve C shows the profile of the cam means for rotary displacement of the transfer and/or dispensing device of the present invention, the said curves relating to a fixed point with respect to the ground.

The transfer and/or dispensing device 16 is connected to the cam follower elements 52 by a sleeve 48 coaxial with the shaft 90 and co-operating with the cam means 46, which are preferably provided in the frame 14 of the apparatus. In practice, the cam follower means 52 include a roller 53 rolling along a corresponding cam path. The profile of the cam path 46 is shown in FIG. 6 by curve B. It is seen that this profile presents vertical bosses 116, 118 including, on the one hand, a profile portion 116a, 118a ensuring the raising of the transfer and/or dispensing device and, on the other hand, a profile portion 116b, 118b ensuring the lowering of the device 16. It is understood that a vertical displacement of the dispensing device 16 is necessary before each stage of transfer between the tank 12 and the container 40, and also to allow the end 22 of the transfer and/or dispensing device 16 to be correctly introduced into the tank 12 or the container 40.

Furthermore, the actuating means 30 including the piston 34 also include a sleeve element 120 mounted in coaxial relationship to the splined shaft 90 so as to be rotated by the latter, which is connected to the previously mentioned cam follower means 50 co-operating with the cam means 44 whose cam profile is represented by the curve A of FIG. 6. It is also seen that this profile A of the cam means 44 includes two bosses 122, 124, the boss profile 122 including a flaring base resulting from the diverging upstream and downstream (with respect to the direction of rotation of the drum 60) sides of the profile. The upstream boss-portion 126 precedes the boss 116 so as to ensure a relative movement of the piston 34 and thus cause the solid particles 4 (suspended in the liquid 5) to be sucked in an appropriate manner, so that, at the point 128, the suction is completed and all the solid particles are sucked in the first section 18a. It is also understood that, between the point 128 and the point 130, the curvilinear portions 122a, 116a of the bosses 122, 116, cause an upward vertical movement of the whole of the device. Thereafter, between the point 130 and the point 132, there takes place no vertical displacement of the vertical device 16 but a rotation thereof owing to the profile portion T of the cam means 94 causing the rotation of the splined shaft 90.

Thereafter, between the points 132 and 134 defining the descending profile portions 122b and 116b of the bosses 122, 166, there takes place a downward vertical displacement of the device 16 whose lower end 22 is thus moved to a position within the container 40. Between the point 134 and the point 136, the downstream boss portion 138 of the boss 122 causes the piston 34 to move downward into the chamber 20, thus discharging the solid particles from the first section 18a with concomitant discharge of the liquid from the second section 18b. This discharge ends at point 136 of the cam profiles A and B. Between the point 136 and the point 138, the ascending profile portion 124a, 118a of the bosses 124, 118 causes a relative upward movement of the device 16 as a whole, whereafter, between the point 138 and the point 140, there takes place the reverse transfer of the device 16 from the container 40 to a position above the tank 12 under the action of the ascending profile portion T' of the cam means 94. Thereafter, from point 140 to point 142, there takes place, owing to the descending profile portion 124b, 118b of the bosses 124, 118, a downward vertical movement of the device 16, which is thus moved to the position shown in FIG. 3.

The starting position is thus again obtained after a 360° rotation of the drum 60. This also appears clearly from FIG. 7 which shows the movement paths of the dispensing device 16 during the rotation of the drum 60, the important points of the cam profile being shown in FIG. 7.

It is also understood that, in the absence of any container 40, the safety device 100 prevents the transfer of the dispensing device 16 to a position above the container 40, in which case the solid particles are discharged into the annular tank 12.

In order to correctly protect the apparatus and prevent casual projections of any products into the tank 12, the apparatus is provided with a cover 150 axially supported by a hydraulic jack piston 152 allowing the cover to be moved vertically when hydraulic fluid under pressure is supplied through the conduit 154, thus permitting easy access to the apparatus. According to the invention, means are provided for supplying an inert and/or sterile and/or filtered gas through an appropriate conduit 156 shown in FIG. 3 into the internal space of the cover 150 so as to completely isolate the interior of the apparatus from the outside. Use may be made, to this end, of a gas consisting of $CO_2$, or $N_2$, or filtered and/or sterile air.

Of course, the means of the invention as defined in the foregoing are capable of many modifications and adaptations without departing from the scope of the invention. The invention therefore includes all means of constituting technical equivalents to the means described as well as their various combinations.

For example, there may be provided means for cleaning the "active" portion of the apparatus of the invention, namely, the tank 12 and the dispensing device 16.

After draining the tank 12 consisting of the aforementioned angular vat or like vessel, a cleaning solution may be supplied through the conduit 10 through which the solid particles are usually supplied and the drum 60 may be caused to rotate to thus cause the said solution to be sucked into the sections 18a, 18b of the device 16 and thereafter discharged through the annular tank 12, thus ensuring a correct cleaning.

It is thus understood that the above-described apparatus results in the technical advantages mentioned in the foregoing and allows carrying out the process of the invention as described.

Moreover, in the particular case where the suspension liquid for the solid particles is capable of fermentation, preferably when the said liquid consists of grape juice or wine, preferably Champagne wine, the particles may advantageously consist of spherical beads of calcium alginate containing inclusions of fermentation microorganisms such as for example yeasts.

Furthermore, according to the present invention, the solid particles preferably consist of beads of a polymer of a higher or slightly higher density than that of the liquid.

Also, the diameter of the holes 28 of the partition wall 26 is of course selected according to the size of the solid particles 4 so as to filter the same. Usually, when the solid particles 4 are spherical beads of calcium alginate containing inclusions of fermantation microorganisms such as for example yeasts, the mean diameter may be of the order of 1.5 to 3 mm.

Moreover, to allow easy replacement of the partition wall 26, forming a filter or sieve, according to the diameter of the solid particles, the device 16 is constituted by several parts easily connectable or disconnectable with or from one another by any appropriate means. For example, the lower section 18a containing the partition wall 26 may consist of a member 200 and the upper section 18b may consist of at least one second member 202.

The supply to the tank 12 is of constant-level type, the tank being provided to this end with any appropriate known device.

There are no stirring means provided in the tank 12, for such stirring is considered useless for the time being. Indeed, even if the solid particles 4 should settle in the tank 12, it would be sufficient to introduce the draw-off end 22 into the settled particles, as seen in FIG. 8, so as to always draw off the same amount of particles 4. Moreover, the amount of liquid is preferably small so that the tank contains essentially particles at a considerable level as is easily understandable to any person conversant with the art.

The invention therefore includes the means constituting technical equivalents to the means described.

What is claimed is:

1. A method for metering and transferring, at a high rate, brittle solid particles with a view to introduce the same into a container, such as a bottle, without damaging said particles, which comprises the steps of:
   suspending said solid particles in an appropriate liquid;
   introducing into the obtained suspension, a metering and transferring device comprising a chamber having a transverse partition wall provided with hole means of a diameter smaller than the particle diameter, said partition wall dividing said chamber into two sections communicating with each other through said hole means, an upper section containing suction and discharge means and a lower section having an opening which is inserted into said suspension;
   sucking said suspension by said suction means so that said liquid is sucked up through said hole means into said upper section, and said solid particles are collected and accumulated in said lower section to a level substantially flush with the said opening of said lower section;
   displacing said device with the solid particles retained in said lower section towards and above said container; and
   discharging said liquid by said discharge means and consequently discharging said solid particles which are carried along with the liquid into the container.

2. A method according to claim 1, wherein the solid particles comprise beads of a density higher than that of the liquid.

3. A method according to claim 1, wherein the solid particles comprise beads of calcium alginate containing inclusions of fermentation micro-organisms, and said liquid is Champagne wine.

4. An apparatus for metering and transferring, at a high rate, brittle solid particles to be introduced into a container, such as a bottle, which comprises in combination:
   a device (16) comprising at least one elongate chamber (18) including a lateral wall (20), said chamber having a closed upper end (24) and an open lower end (22);

a transverse partition wall (26) provided in said chamber in substantially perpendicular relationship to said lateral wall and dividing said chamber into two sections, an upper section (18b) containing suction and discharge means (30, 34) and a lower section (18a) omprising said open end;

hole means (28) provided in said partition wall and having a diameter smaller than the particle diameter, said hole means allowing communication of said upper and lower sections with each other; and means (32) for actuating said suction and discharge means (30, 34).

5. An apparatus according to claim 4 which further comprises a frame (14), a tank (12) receiving the particles suspended in a liquid, and means for actuating said device (16) in vertical translation and in rotation with respect to said frame and to said tank, so as to transfer the particles sucked from said tank into the container.

6. An apparatus according to claim 4, wherein said suction and discharge means comprise a piston (34) slidably arranged in said closed upper section (18b) of said chamber.

7. An apparatus according to claim 4, which further comprises a drum (60) rotatably mounted on said frame (14) and provided with a plurality of devices (16), and means (62, 64) for automatically conveying containers to a position opposite each said device.

8. An apparatus according to claim 4, which comprises a shaft (90) jointly rotatable with said device and cam means for controlling rotation of said shaft.

9. An apparatus according to claim 5, wherein said tank (12) is of an annular shape and storage means are provided to supply said tank with the solid particles in suspension in the liquid, at a substantially constant level.

10. An apparatus according to claim 5, which further comprises a protective cover forming an internal space which is supplied with a sterile gas.

* * * * *